US012731253B2

(12) United States Patent
Birkhold et al.

(10) Patent No.: US 12,731,253 B2
(45) Date of Patent: Sep. 8, 2026

(54) PROVIDING A RESULT DATASET

(71) Applicant: Siemens Healthcare GmbH, Erlangen (DE)

(72) Inventors: Annette Birkhold, Stuttgart (DE); Markus Kowarschik, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 348 days.

(21) Appl. No.: 18/371,020

(22) Filed: Sep. 21, 2023

(65) Prior Publication Data

US 2024/0104728 A1 Mar. 28, 2024

(30) Foreign Application Priority Data

Sep. 23, 2022 (EP) .................................... 22197288

(51) Int. Cl.
*G06T 7/00* (2017.01)
*G06T 12/00* (2026.01)
*G06V 10/82* (2022.01)

(52) U.S. Cl.
CPC ............ *G06T 7/0012* (2013.01); *G06T 12/00* (2026.01); *G06V 10/82* (2022.01); *G06T 2207/30101* (2013.01); *G06T 2210/41* (2013.01)

(58) Field of Classification Search
CPC ................. G06T 7/0012; G06T 11/003; G06T 2207/30101; G06T 2210/41;

(Continued)

(56) References Cited

U.S. PATENT DOCUMENTS 7,782,998 B2 * 8/2010 Langan .................. G06T 12/10 378/8
8,029,444 B2 * 10/2011 Pedrizzetti .............. A61B 8/08 600/443

(Continued)

FOREIGN PATENT DOCUMENTS

CN 113874910 A * 12/2021 ............ A61B 6/032
CN 115205192 A * 10/2022 ............ G06N 20/00

(Continued)

OTHER PUBLICATIONS

Gullett et al. "A deformation gradient tensor and strain tensors for atomistic simulations." Modelling and Simulation in Materials Science and Engineering 16.1 (2007) (Year: 2007).*

(Continued)

*Primary Examiner* — Stephen R Koziol
*Assistant Examiner* — Benedict E Lee
(74) *Attorney, Agent, or Firm* — Lempia Summerfield Katz LLC

(57) ABSTRACT

The disclosure relates to a method for providing a result dataset, a method for providing a trained function, a provisioning unit, a medical imaging device, and a computer program product. The method for providing the result dataset includes capturing medical image data, wherein the medical image data maps a temporal change in an anatomical object in an examination object in a spatially and temporally resolved manner. The method further includes identifying at least one inhomogeneously deforming region of the anatomical object based on the image data and providing the result dataset based on the image data, wherein the result dataset has a dedicated map and/or at least one deformation parameter of the at least one inhomogeneously deforming region.

20 Claims, 6 Drawing Sheets

(58) Field of Classification Search
CPC . G06T 2207/10076; G06T 2207/10121; G06T 2207/30016; G06V 10/82
See application file for complete search history.

(56) References Cited

U.S. PATENT DOCUMENTS

| | | | | |
|---|---|---|---|---|
| 10,890,641 | B2 * | 1/2021 | Wang | G01R 33/5608 |
| 10,949,973 | B2 * | 3/2021 | Kim | G06T 7/0016 |
| 2007/0282202 | A1 | 12/2007 | Maurice | |
| 2009/0232379 | A1 | 9/2009 | Kohler | |
| 2010/0128946 | A1 * | 5/2010 | Fidrich | G06T 7/149<br>382/131 |
| 2011/0142315 | A1 | 6/2011 | Hsieh | |
| 2011/0142316 | A1 * | 6/2011 | Wang | G06T 12/20<br>382/131 |
| 2018/0199905 | A1 | 7/2018 | Kowarschik et al. | |
| 2019/0066847 | A1 * | 2/2019 | Jung | G16H 50/70 |
| 2019/0223725 | A1 * | 7/2019 | Lu | A61B 5/0044 |
| 2020/0188024 | A1 * | 6/2020 | Breininger | G16H 50/50 |
| 2020/0219272 | A1 * | 7/2020 | Pizer | G06V 20/46 |
| 2021/0110196 | A1 * | 4/2021 | Syeda-Mahmood | G06N 3/088 |
| 2021/0248762 | A1 * | 8/2021 | Pfister | G06T 7/149 |
| 2021/0343405 | A1 | 11/2021 | Di Martino | |
| 2022/0005192 | A1 * | 1/2022 | Gao | G06T 7/0012 |
| 2022/0122717 | A1 * | 4/2022 | Budz | G16H 30/40 |
| 2022/0330902 | A1 | 10/2022 | Forneris | |
| 2023/0172571 | A1 | 6/2023 | Birkhold | |
| 2023/0316511 | A1 * | 10/2023 | Tsai | G06V 10/454 |

FOREIGN PATENT DOCUMENTS

| | | | | | |
|---|---|---|---|---|---|
| CN | 116615151 | A | * | 8/2023 | G06T 19/20 |
| CN | 115115570 | B | * | 7/2025 | G06F 18/253 |
| DE | 102009007366 | A1 | * | 8/2010 | A61B 6/504 |
| DE | 102011081480 | B4 | * | 11/2014 | A61B 5/4519 |
| EP | 2367153 | B1 | | 5/2014 | |
| JP | 7024954 | B2 | * | 2/2022 | A61B 6/507 |
| WO | WO-0180184 | A1 | * | 10/2001 | G06T 12/10 |
| WO | WO-2018012080 | A1 | * | 1/2018 | G06T 7/337 |
| WO | WO-2019231844 | A1 | * | 12/2019 | G06V 10/454 |
| WO | 2021059243 | A1 | | 4/2021 | |

OTHER PUBLICATIONS

Li et al. "An Overview of Systems and Techniques for Autonomous Robotic Ultrasound Acquisitions," in IEEE Transactions on Medical Robotics and Bionics, vol. 3, No. 2, pp. 510-524, May 2021, doi: 10.1109/TMRB.2021.3072190 (Year: 2021).*

Selskog, Pernilla, et al. "Kinematics of the heart: strain-rate imaging from time-resolved three-dimensional phase contrast Mri." IEEE Transactions on Medical Imaging 21.9 (2002): 1105-1109 (Year: 2002).*

Bracamonte, Johane H., et al. "Patient-specific inverse modeling of in vivo cardiovascular mechanics with medical image-derived kinematics as input data: concepts, methods, and applications." Applied Sciences 12.8 (2022): 3954. (Year: 2022).*

Jailin, C. et al., "Projection-Based Measurement and Identification. In: , et al. Advancements in Optical Methods & Digital Image Correlation in Experimental Mechanics, vol. 3". Conference Proceedings of the Society for Experimental Mechanics Series. Springer, Cham. https://doi.org/10.1007/978-3-030-30009-8_20. (2000), pp. 1-5.

Maupu C. et al., "Imaging Modalities for Intracranial Aneurysm: More Than Meets the Eye," Cardiovasc. Med. 9:793072. doi: 10.3389/fcvm.2022.793072, (Feb. 15, 2022), pp. 1-9.

Meuschke Monique et al. "Aneulysis—A system for the visual analysis of aneurysm data", Computers and Graphics, Elsevier, GB, Bd. 98, (Jun. 10, 2021), pp. 197-209.

Rohkohl Christopher et al., "Interventional 4-D Motion Estimation and Reconstruction of Cardiac Vasculature without Motion Periodicity Assumption", Interventional 4-D Motion Estimation and Reconstruction; Vol. Lecture Notes in Computer Science, 5761 Heidelberg : Springer 2009, pp. 132-139.

Rohkohl Christopher et al., "Interventional 4D motion estimation and reconstruction of cardiac vasculature without motion periodicity assumption", Miccai, Medical Image Analysis, vol. 14, issue 5, 2010, pp. 687-694.

Signorelli Francesco et al., "Biomechanical Characterization of Intracranial Aneurysm Wall: A Multiscale Study", World Neurosurgery, vol. 119, Nov. 2018, pp. e882-e889.

Zhang J, et al., Abstract for "Irregular pulsation of aneurysmal wall is associated with symptomatic and ruptured intracranial aneurysms", NeuroIntervent Surg doi:10.1136/neurintsurg-2021-018381, (2021), pp. 1-9.

* cited by examiner

I t 37
38
21
34
41
42
25
26
31
PRVS
24
33
32

PROVIDING A RESULT DATASET

The present patent document claims the benefit of European Patent Application No. 22197288.8, filed Sep. 23, 2022, which is hereby incorporated by reference in its entirety.

TECHNICAL FIELD

The disclosure relates to a method for providing a result dataset, a method for providing a trained function, a provisioning unit, a medical imaging device, and a computer program product.

BACKGROUND

Aneurysms, (e.g., intracranial aneurysms), are frequently asymptomatic and have a low risk of rupture. Nevertheless, a rupture of an aneurysm is fatal for about half of all patients. The size and position of the aneurysm may be used as the basis for determining a risk score for a rupture of the aneurysm. In addition to these conventional parameters, in particular the size and position of the aneurysm, the pulsatility of the aneurysm may be of significance for the risk of rupture. For example, it is known from the publications by Maupu et al., "Imaging Modalities for Intracranial Aneurysm: More Than Meets the Eye," 2022, Front. Cardiovasc. Med., 9:793072, and Zhang et al., "Irregular pulsation of aneurysmal wall is associated with symptomatic and ruptured intracranial aneurysms," Journal of NeuroInterventional Surgery, Published Online First: 15 Feb. 2022, that inhomogeneous pulsation of aneurysms is a significant dynamic parameter, since increased motion of a wall, in particular a vessel wall of the aneurysm, is associated with reduced stability of the wall and an increased risk of rupture.

Pulsation may have three components of motion: global pulsation of the aneurysm, motions of focal regions of the wall, (e.g., blebs), and global cerebral vascular motion during a cardiac cycle. In addition, the amplitude of the pulsations is low, and pulsation is only of short duration. Moreover, artifacts, (e.g., imaging artifacts), may adversely interfere with data capture. In addition, it is furthermore known from the publication by Signorelli et al., "Biomechanical Characterization of Intracranial Aneurysm Wall: A Multiscale Study," World Neurosurgery, Volume 119, November 2018, p. e882-e889, that ruptures frequently occurred in limited regions of aneurysms with increased elastic capacity, while regions without ruptures had increased rigidity.

SUMMARY AND DESCRIPTION

It is therefore the object of the present disclosure to enable inhomogeneously deforming regions of an anatomical object to be captured.

The scope of the present disclosure is defined solely by the appended claims and is not affected to any degree by the statements within this summary. The present embodiments may obviate one or more of the drawbacks or limitations in the related art.

The way in which the object is achieved is described below with respect to methods and apparatuses for providing a result dataset and with respect to methods and apparatuses for providing a trained function. In this context, features, advantages, and alternative embodiments of data structures and/or functions in methods and apparatuses for providing a result dataset may be transferred to similar data structures and/or functions in methods and apparatuses for providing a trained function. In this context, similar data structures may in particular be characterized by the use of the prefix "training." Furthermore, the trained functions used in methods and apparatuses for providing a result dataset may in particular be adjusted and/or provided by methods and apparatuses for providing a trained function.

In a first aspect, the disclosure relates to a method, (e.g., a computer-implemented method), for providing a result dataset. Herein, in one act, medical image data that maps a change in an anatomical object in an examination object in a spatially and temporally resolved manner is captured. In a further act, at least one inhomogeneously deforming region of the anatomical object is identified based on the image data. In a further act, the result dataset is provided based on the image data. Herein, the result dataset has a dedicated map and/or at least one deformation parameter of the at least one inhomogeneously deforming region. The above-described acts of the proposed method may be at least partially computer-implemented, in particular completely computer-implemented.

Capturing the medical image data may include acquiring and/or receiving the medical image data. Advantageously, the medical image data may be acquired by a medical imaging device. Acquisition of the image data may be triggered by a physiological signal, (e.g., ECG-triggered). The medical imaging device for acquiring the medical image data may be embodied as a medical X-ray device, in particular a medical C-arm X-ray device and/or a cone-beam computed tomography system (cone-beam CT, CBCT) and/or a computed tomography system (CT system) and/or a magnetic resonance imaging system (MRI system) and/or a positron emission tomography system (PET system) and/or an ultrasound device. The reception of the medical image data may include capturing the data and/or reading the data from a computer-readable data storage unit and/or receiving the data from a data storage unit, (e.g., a database). Furthermore, the medical image data may be provided by a provisioning unit of the medical imaging device.

The medical image data may include a two-dimensional (2D) and/or three-dimensional (3D) spatially and temporally resolved map of the anatomical object in the examination object. In addition, the medical image data may map the change in the anatomical object, (e.g., motion and/or deformation of the anatomical object and/or contrast medium flow in the anatomical object), in a spatially and temporally resolved manner. In particular, the medical image data may map the change in the anatomical object in a 2D and/or 3D spatially resolved manner at a plurality of acquisition times. The change in the anatomical object may occur at least partially periodically, in particular completely periodically. Herein, the medical image data may advantageously map at least one period of the change in the anatomical object in a spatially and temporally resolved manner.

Examination objects may be human and/or veterinary patients and/or examination phantoms. Anatomical objects may include organs and/or tissue, in particular muscle tissue and/or tumor tissue, and/or hollow organs, in particular vessel portions, and/or vessel malformations, in particular aneurysms.

Advantageously, at least one inhomogeneously deforming region, (e.g., a plurality of inhomogeneously deforming regions), of the anatomical object may be identified based on the image data. The at least one inhomogeneously deforming region may have a deformation, (e.g., a deformation amplitude and/or deformation direction and/or deformation speed and/or deformation rate), deviating from adjacent tissue of the anatomical object. The anatomical object may have a wall, (e.g., a tissue boundary and/or a vessel wall), which surrounds the anatomical object, (e.g., surrounds the object completely). Herein, the at least one inhomogeneously deforming region may be identified as a local bleb, (e.g., a vesicular bleb), in the wall of the anatomical object. The at least one inhomogeneously deforming region of the anatomical object may be identified manually, (e.g., by manual annotation of the image data and/or volume punching), and/or automatically, (e.g., by applying an anomaly detection algorithm to the image data and/or by analyzing time intensity curves, in particular time-density curves of image points of the image data). Herein, advantageously, a map of the at least one inhomogeneously deforming region, (e.g., the plurality of inhomogeneously deforming regions), of the anatomical object, may be identified, (e.g., annotated in the image data).

The result dataset is provided based on the image data. Herein, the result dataset may have a dedicated map, in particular a spatially and/or temporally limited and/or optimized map, of the at least one inhomogeneously deforming region of the anatomical object. The dedicated map may advantageously be provided based on the identification of the at least one inhomogeneously deforming region of the anatomical object in the image data. For example, the dedicated map may be provided with higher spatial and/or temporal resolution than the image data and/or limited to the at least one inhomogeneously deforming region and/or with a mapping parameter optimized for mapping the at least one deforming region, for example binning and/or contrast.

Alternatively, or additionally, the result dataset may have a deformation parameter, in particular an absolute and/or relative deformation parameter, (e.g., a deformation amplitude and/or deformation direction and/or a deformation speed and/or deformation rate and/or positioning information), of the at least one inhomogeneously deforming region. Herein, the deformation parameter may characterize the deformation of the at least one inhomogeneously deforming region of the anatomical object qualitatively and/or quantitatively. The relative deformation parameter may be determined with respect to the deformation of a reference region, in particular a homogeneously deforming region, of the anatomical object, (e.g., as a difference and/or ratio). The positioning information may describe a spatial position and/or alignment and/or a geometric feature, (e.g., a contour and/or surface), of the at least one deforming region.

The provision of the result dataset based on the image data may include storing the result dataset on a computer-readable storage medium and/or displaying the result dataset on a display unit and/or transmitting the result dataset to a provisioning unit. In particular, a graphical depiction of the result dataset may be displayed by the display unit.

Advantageously, the proposed method may enable the at least one inhomogeneously deforming region of the anatomical object to be captured. The result dataset, (e.g., the dedicated map and/or the at least one deformation parameter of the at least one inhomogeneously deforming region), may advantageously support a medical operator in an examination and/or treatment of the anatomical object. Based on the image data, (e.g., a single 3D spatially, and also temporally, resolved map of the anatomical object), the proposed method may enable motion and/or deformation of the anatomical object, (e.g., the wall of an aneurysm and/or a vessel portion), to be quantified, in particular directly and efficiently. The dataset provided may enable subsequent analysis of the inhomogeneous deformation, in particular pulsatile motion.

In a further advantageous embodiment of the proposed method, a map of an initial state of the anatomical object may be identified in the image data. Herein, in each case, a displacement field for further states of the anatomical object mapped in the image data may be determined with respect to the initial state. The result dataset may advantageously be additionally provided based on the displacement fields.

Advantageously, the initial state may be characterized by a specified state of change, in particular a specified state of motion and/or deformation, of the anatomical object, (e.g., a minimum, maximum, or average state of change). In addition, different states of deformation, in particular at least one period of states of deformation, of the anatomical object may be mapped in a spatially and temporally resolved manner in the image data. For example, a map of the anatomical object, (e.g., the vessel portion and/or aneurysm), may be identified as a map of the initial state, which maps the anatomical object having a minimum volume. This may be advantageous since an undeformed state of the anatomical object is substantially absent in vivo due to loading between systolic and diastolic pressure.

Furthermore, in each case, a displacement field for the further states of the anatomical object mapped in the image data may be determined with respect to the initial state. In particular, the displacement fields may be determined for a surface and/or the wall of the anatomical object. Herein, the displacement fields may characterize the deformation of the anatomical object with respect to the initial state, in particular in 2D and/or 3D, in a spatially resolved manner for the acquisition times of the image data. The determination of the displacement fields may take place by applying a projection-based digital volume correlation (P-DVC) with kinematic regularization of the displacement fields, as known, for example, from the publication by Jailin et. al., "Projection-Based Measurement and Identification," Advancements in Optical Methods & Digital Image Correlation in Experimental Mechanics, 2020, Volume 3, Conference Proceedings of the Society for Experimental Mechanics Series, Springer, Cham, wherein, instead of a static 3D reference image, the map, (e.g. a 3D map), of the initial state may be used. Starting from the time of acquisition of the initial state, the displacement fields may be determined, (e.g., calculated), in positive and negative temporal dimensions. This enables dynamic pulsatile motion of the anatomical object, in particular inhomogeneous deformation, to be determined by a 3D map of the change to the anatomical object, thereby, for example, advantageously enabling an X-ray dose to be reduced.

Alternatively, or additionally, the determination of the displacement fields may include 3D-3D deformable registration, for example, SICLE registration (small-deformation inverse-consistent linear-elastic image registration) and extraction of transformation matrices. Alternatively, or additionally, the provision of the result dataset may include the application of an adjusted algorithm for cardiac vascular reconstruction (CAVAREC) characterized by the iterative calculation of a not necessarily periodic, time-dependent displacement field describing the motion of the anatomical object during image acquisition. An example of a CAVAREC algorithm is, for example, known from the publication by Rohkohl et al., "Interventional 4D motion estimation and reconstruction of cardiac vasculature without motion periodicity assumption," Medical Image Analysis, Volume 14, Issue 5, 2010, Pages 687-694.

Advantageously, the provision of the result dataset, (e.g., the dedicated map and/or the at least one deformation parameter of the at least one inhomogeneously deforming region), may additionally be based on the displacement fields. For example, a spatially and temporally resolved map and/or representation, (e.g., a kinematic model), of the anatomical object, (e.g., the aneurysm), may be determined based on the displacement fields.

In a further advantageous embodiment of the proposed method, the at least one deformation parameter having in each case a strain tensor may be determined as a gradient of the displacement fields.

Advantageously, in each case, a strain tensor may be determined as a spatial gradient of the displacement fields. Hence, in each case a strain tensor may be determined at each acquisition time point of the image data mapping a further state of the anatomical object. The determination of the strain tensors may be determined by a sliding window approach. Herein, the strain tensors may characterize, in particular quantify, a strain, (e.g., a mechanical strain), occurring on the anatomical object, (e.g., due to deformation and/or elongation and/or compression). In addition, the plurality of strain tensors may map the strain occurring on the anatomical object in a spatially and temporally resolved manner.

The strain tensors may enable spatially resolved identification of regions with increased strain, in particular mechanical strain, (e.g., due to the action of compressive forces and/or tensile forces and/or shear forces), on the anatomical object, (e.g., the wall of the anatomical object).

In a further advantageous embodiment of the proposed method, the at least one deformation parameter having a maximum strain tensor, which, for image points of the image data mapping a wall of the anatomical object, relates to a temporal maximum of a strain, (e.g., a mechanical strain on a wall), and/or strain rate tensors as the time derivative of the strain tensors, may be provided. Alternatively, or additionally, the at least one deformation parameter having the strain rate tensors as the time derivative of the strain tensors and a maximum strain rate tensor, which, for image points of the image data mapping a wall of the anatomical object, relates to a temporal maximum of a strain rate of the wall, may be provided.

Advantageously, for the image points of the image data that maps the wall of the anatomical object, in each case, the temporal maximum of the strain on the wall, (e.g., the temporal maximum of the strain tensors), may be determined, (e.g., by comparing values of the strain tensors of the respective image point). Herein, the temporal maximum may designate a maximum of the values of the strain tensors for an image point of the image data, because each strain tensor in each case corresponds to a time of acquisition of the image data. The image points of the image data that maps the anatomical object, may be based on threshold values and/or identified based on an anatomical atlas. Advantageously, the deformation parameter having in each case a temporal maximum value of the strain tensors may be provided for the image points of the image data, wherein the image points map a wall of the anatomical object. Advantageously, the result dataset, (e.g., the deformation parameter), having a biomechanical model of the anatomical object, (e.g., a biomechanical aneurysm model), may be provided. In particular, the deformation parameter may be provided based on the maximum temporal values of the strain tensors having a 3D spatially resolved dataset, (e.g., an image depiction), of a maximum elongation of the wall of the anatomical object.

Alternatively, or additionally, strain rate tensors, (e.g., tensors of the strain rate), may be provided as the time derivative of the strain tensors. In addition, the maximum strain rate tensor, which, for image points of the image data mapping the wall of the anatomical object, relates to the temporal maximum of the strain rate of the wall, may be determined, (e.g., as the temporal maximum of the tensors of the strain rate for the image points of the image data), which image points map the wall of the anatomical object. Advantageously, the deformation parameter having in each case a maximum temporal value of the strain rate may be provided for the image points of the image data, which image points map the wall of the anatomical object. In particular, the deformation parameter may be provided based on the maximum temporal values of the strain rates having a 3D spatially resolved dataset, in particular an image, of a maximum strain rate of the wall of the anatomical object.

The provision of the result dataset may advantageously include displaying a graphical depiction, (e.g., a color-coded depiction), of the at least one deformation parameter. The proposed embodiment may enable improved identification of structural inhomogeneities of the anatomical object, in particular the wall of the anatomical object. In particular, a graphical depiction of the maximum strain tensor and/or maximum strain rate tensor may enable improved identification of the structural inhomogeneities of the anatomical object, in particular the wall of the anatomical object.

In a further advantageous embodiment of the proposed method, the capturing of the medical image data may include acquiring a plurality of projection mappings, (e.g., a plurality of X-ray projection mappings), which map the change in the anatomical object in the examination object from at least partially different projection directions. Herein, an acquisition rate for acquiring the projection mappings may be adjusted in dependence on a heart rate and/or respiratory rate of the examination object. In addition, the projection directions of adjacent projection mappings may have an acute angle with respect to one another. Furthermore, the image data may be reconstructed from the projection mappings.

Advantageously, the medical imaging device may have a source, (e.g., an X-ray source), and a detector, (e.g., an X-ray detector), for acquiring the image data. For acquiring the projection mappings, the source may emit an X-ray beam bundle to illuminate the examination object, in particular the anatomical object, which X-ray beam bundle is detected by the detector after interaction with the examination object, in particular the anatomical object. Herein, a spatial resolution of the projection mappings may be limited by a native resolution of the detector, (e.g., a flat-panel detector). A temporal resolution of the image data may be limited by an acquisition rate of the sensor and/or a rotational speed of the imaging device during the acquisition of the projection mappings. Advantageously, the plurality of projection mappings may be acquired at a plurality of different acquisition times. Herein, an acquisition rate, (e.g., a frequency of the acquisition times), for acquiring the projection mappings may be adjusted in dependence on the heart rate, (e.g., a pulse), and/or a respiratory rate of the examination object. For this purpose, in particular before and/or during the acquisition of the projection mappings, a signal from a heart rate sensor and/or a respiration sensor and/or an ECG signal may be received. Moreover, the projection mappings may map the change in the anatomical object in the examination object from at least partially different, in particular completely different, projection directions, in particular angulations. For this purpose, the arrangement of source and detector may be mounted movably, (e.g., rotatably), with respect to the examination object. Herein, in each case, adjacent projection mappings, in particular projection mappings which are acquired directly one after the other, may have an acute angle, in particular an angle of smaller than 90 degrees, with respect to one another. The projection mappings may map a contrast medium flow in the anatomical object.

The image data may advantageously be reconstructed from the plurality of projection mappings, (e.g., by back projection, in particular filtered back projection). The plurality of projection mappings may map the anatomical object in a first temporal phase, (e.g., a mask phase), and in a second temporal phase, (e.g., a fill phase), wherein, during the second temporal phase, a contrast medium is used in the anatomical object, for example, by digital subtraction angiography (DSA). The reconstruction of the image data from the projection mappings may include subtraction of the projection mappings of the mask phase from the projection mappings of the fill phase. In addition, a plausibility-based boundary condition for the flow of contrast medium may be used to determine a time point of an influx of the contrast medium into the anatomical object, (e.g., a bolus arrival time), for the image points, (e.g., voxels), of the image data. First, a volume of the anatomical object, for example a 3D vascular volume, may be determined based on the image data. Furthermore, an intensity course over time, in particular a 4D value, may be determined for the voxels within the volume by multiplicative back projection of the individual projection mappings.

The projection mappings of the fill phase may advantageously be acquired at a low rotational speed of the medical imaging device, (e.g., 10 s for an angle of rotation of 200°). Advantageously, the contrast medium may have a consistent filling status in the anatomical object during the fill phase.

The proposed embodiment may enable reliable and simultaneously X-ray-dose-efficient capturing of the at least one inhomogeneously deforming region of the anatomical object in the projection mappings, in particular in projection mappings of a single rotation run.

In a further advantageous embodiment of the proposed method, the provision of the result dataset may include reconstructing the dedicated map of the at least one inhomogeneously deforming region from the projection mappings. Herein, the reconstruction may be spatially and temporally limited to the at least one inhomogeneously deforming region.

The dedicated map of the at least one inhomogeneously deforming region may, in particular similarly to the image data, be reconstructed from the plurality of projection mappings, (e.g., by back projection, in particular filtered back projection). Herein, the reconstruction may be limited spatially and/or temporally, in particular spatio-temporally, to the at least one inhomogeneously deforming region. Furthermore, the reconstruction of the dedicated map may take place with a voxel size that is smaller than a spatially and/or temporally unlimited reconstruction. In addition, advantageously, only relevant time acts may be reconstructed, but then with maximum temporal resolution. This enables the dedicated map to be limited to the spatially and/or temporally relevant region and to be reconstructed in a particularly computationally efficient manner. In addition, this may enable improved, in particular optimized, spatial and/or temporal resolution of the dedicated map.

In a further advantageous embodiment of the proposed method, an acquisition parameter for a dedicated map of the at least one inhomogeneously deforming region may be determined based on the identification of the at least one inhomogeneously deforming region. Herein, further medical image data may be captured by the acquisition parameter. In addition, the result dataset may additionally be provided based on the further image data.

The acquisition parameter may include acquisition geometry, (e.g., a mapped field of view (FOV) and/or a projection direction and/or trajectory and/or acquisition positions and/or resolution, in particular a spatial and/or temporal resolution), and/or an operating parameter, (e.g., an X-ray dose and/or acquisition rate), for the medical imaging device for acquiring the further medical image data. The further medical image data may have all the features and properties that have been described in respect of the medical image data and vice versa. Advantageously, the medical image data and the further medical image data may be acquired by the same or different medical imaging devices.

Advantageously, the acquisition parameter may be determined based on the identification of the at least one inhomogeneously deforming region of the anatomical object. In addition, the acquisition parameter may additionally be determined based on a further acquisition parameter for acquiring the medical image data. Herein, the acquisition parameter may be determined such that the further medical image data captured by the acquisition parameter has the dedicated map of the at least one inhomogeneously deforming region. For example, the acquisition parameter may be determined such that the dedicated map has spatial and/or temporal resolution that is higher than that of the medical image data and/or is limited to the at least one inhomogeneously deforming region and/or has binning and/or contrast optimized for the map of the at least one deforming region. In particular, the temporal resolution of the further medical image data may be adjusted to the deformation, (e.g., a deformation speed), of the at least one inhomogeneously deforming region.

Advantageously, the result dataset may additionally be provided based on the further image data. Herein, the result dataset may have the dedicated map of the at least one inhomogeneously deforming region of the anatomical object. Alternatively, or additionally, the result dataset may have the deformation parameter, which deformation parameter is determined based on the further medical image data or based on the medical image data and the further medical image data. The further image data may include at least one further projection map, (e.g., a plurality of further projection mappings). Herein, the provision of the result dataset may include back projection, (e.g., filtered back projection), of the at least one further projection map onto the image data, (e.g., for local improvement of the map of the at least one inhomogeneously deforming region in the image data). For this purpose, synchronization of motion patterns mapped in the image data and the further image data, (e.g., by an ECG signal, in particular an ECG-triggered and/or image-based signal), may be advantageous.

This may advantageously enable improved capturing of the at least one inhomogeneously deforming region.

In a further advantageous embodiment of the proposed method, the acquisition parameter may have at least one projection direction for acquiring further projection mappings of the at least one inhomogeneously deforming region. In addition, the further image data may be reconstructed from the further projection mappings.

Advantageously, the acquisition parameter may have the at least one projection direction, in particular a plurality of different projection directions, for acquiring a plurality of further projection mappings of the at least one inhomogeneously deforming region. Herein, the plurality of further projection mappings may map the at least one inhomogeneously deforming region from the at least one projection direction, in particular from the plurality of different projection directions. Advantageously, the at least one projection direction may be determined such that the deformation of the at least one inhomogeneously deforming region is mapped in the at least one further projection map. For example, the at least one projection direction may be arranged at an angle for acquiring the further projection mappings, (e.g., at a right angle), with respect to a, in particular resulting, deformation direction of the deformation of the at least one inhomogeneously deforming region. In addition, the projection directions of in each case adjacent further projection mappings may have an acute angle with respect to one another. Advantageously, the further image data may be reconstructed from the further projection mappings, in particular similarly to the image data.

This may advantageously enable improved capturing, (e.g., mapping), of the at least one inhomogeneously deforming region in the at least one further projection map.

In a further advantageous embodiment of the proposed method, the anatomical object may have a hollow organ, (e.g., a lung and/or a heart), and/or a vessel portion, (e.g., an artery and/or vein), and/or an aneurysm, (e.g., an aortic aneurysm), and/or an organ, (e.g., a liver and/or a brain), and/or tissue, (e.g., muscle tissue and/or tumor tissue).

Herein, the anatomical object may have the at least one inhomogeneously deforming region on a surface, (e.g., a tissue boundary and/or a wall). In particular, the at least one inhomogeneously deforming region may be identified on the surface of the anatomical object based on the image data. The proposed embodiment may advantageously enable the at least one inhomogeneously deforming region to be captured on a hollow organ and/or vessel portion and/or aneurysm and/or organ and/or tissue of the examination object.

In a further advantageous embodiment of the proposed method, the at least one inhomogeneously deforming region may be identified based on time intensity curves of image points of the image data that maps a wall of the anatomical object.

Advantageously, the image points of the image data that maps the wall of the anatomical object may in each case have a time intensity curve. Herein, the at least one inhomogeneously deforming region of the anatomical object may be identified by analysis of the time intensity curves, for example, by comparison and/or statistical analysis of the time intensity curves, for example, over a predefined time interval. Herein, the at least one inhomogeneously deforming region of the anatomical object may be identified based on a locally increased amplitude of intensity fluctuations in time intensity curves, (e.g., in comparison to the other time intensity curves), and/or an average amplitude of the intensity fluctuations in the time intensity curves. In addition, the identification of the at least one inhomogeneously deforming region of the anatomical object may additionally take place by comparison of the time intensity curves with a heart rate and/or pulse rate, for example, based on an ECG signal. The proposed embodiment may advantageously enable precise identification of the at least one inhomogeneously deforming region.

In a further advantageous embodiment of the proposed method, the identification of the at least one inhomogeneously deforming region of the anatomical object may include applying a trained function to input data. Herein, the input data may be based on the image data. Furthermore, at least one parameter of the trained function may be adjusted based on a comparison of at least one inhomogeneously deforming training region with at least one inhomogeneously deforming comparison region.

The trained function may advantageously be trained by a machine learning method. In particular, the trained function may be a neural network, (e.g., a convolutional neural network (CNN) or a network including a convolutional layer).

The trained function maps input data to output data. In this context, the output data may in particular still depend on one or more parameters of the trained function. The one or more parameters of the trained function may be determined and/or adjusted by training. The determination and/or adjustment of the one or more parameters of the trained function may in particular be based on a pair including training input data and associated training output data, (e.g., comparison output data), wherein the trained function is applied to the training input data to generate training map data. In particular, the determination and/or adjustment may be based on a comparison of the training map data and/or the training output data, in particular comparison output data. A trainable function, (i.e., a function with one or more parameters that have not yet been adjusted), may also be referred to as a trained function.

Other terms for trained functions are trained map rule, map rule with trained parameters, function with trained parameters, algorithm based on artificial intelligence, and machine learning algorithm. One example of a trained function is an artificial neural network, wherein edge weights of the artificial neural network correspond to the parameters of the trained function. The term "neural net" may also be used instead of the term "neural network." In particular, a trained function may be a deep neural network (or deep artificial neural network). A further example of a trained function is a "support vector machine," moreover, in particular other machine learning algorithms may also be used as trained functions.

The trained function may be trained by back propagation. First, training map data may be determined by applying the trained function to training input data. Then, a deviation between the training map data and the training output data, (e.g., the comparison output data), may be ascertained by applying an error function to the training map data and the training output data, (e.g., the comparison output data). Furthermore, at least one parameter, (e.g., a weighting of the trained function), may be iteratively adjusted. In this way, the deviation between the training map data and the training output data, (e.g., the comparison output data), may be minimized during the training of the trained function.

Advantageously, the trained function, (e.g., the neural network), has an input layer and an output layer. Herein, the input layer may be embodied to receive input data. Furthermore, the output layer may be embodied to provide map data, (e.g., output data). Herein, the input layer and/or the output layer may in each case include a plurality of channels, in particular neurons.

The input data of the trained function may be based on the image data. In particular, the input data of the trained function may include the image data. Furthermore, the trained function may provide the identification, for example localization and/or annotation, of the at least one inhomogeneously deforming region of the anatomical object as output data. Advantageously, at least one parameter of the trained function may be adjusted based on the comparison of the at least one inhomogeneously deforming training region with the at least one inhomogeneously deforming comparison region. In particular, the trained function may be provided by an embodiment of the proposed method for providing a trained function, as described hereinafter. The proposed embodiment may advantageously enable computationally efficient identification of the at least one inhomogeneously deforming region.

In a second aspect, the disclosure relates to a method, (e.g., a computer-implemented method), for providing a trained function. Herein, medical training image data is captured. The medical training image data maps a temporal change in an anatomical training object in a training examination object in a spatially and temporally resolved manner. In a further act, at least one inhomogeneously deforming comparison region of the anatomical training object is identified based on user input and/or annotation and/or based on time intensity curves of image points of the training image data and/or by applying an anomaly detection algorithm. The anomaly detection algorithm may identify a change in a curvature of the anatomical object that exceeds a specified threshold value within a specified time interval. In a further act, at least one inhomogeneously deforming training region of the anatomical training object is identified by applying the trained function to input data. Herein, the input data is based on the training image data. Furthermore, at least one parameter of the trained function is adjusted by a comparison of the at least one anatomical training region with the at least one anatomical comparison region. Then, the trained function is provided.

Capturing the medical training image data may include acquiring and/or receiving the medical training image data, (e.g., similarly to the capturing of the medical image data). In addition, the medical training image data may be simulated. The medical training image data and the anatomical training object may in each case have all the features and properties of the medical image data and the anatomical object which have been described in respect of the proposed method for providing a result dataset, and vice versa.

The at least one inhomogeneously deforming comparison region of the anatomical training object may be identified based on the user input and/or the annotation and/or the time intensity curves of the image points of the training image data and/or by applying the anomaly detection algorithm. The user input may be captured by an input unit, (e.g., an input display and/or a keyboard and/or a pointing device and/or a sensor for gesture and/or speech recognition). The at least one comparison region may be annotated manually or semi-automatically, (e.g., based on the user input), or fully automatically, (e.g., by applying the anomaly detection algorithm). Alternatively, or additionally, the at least one comparison region may be identified by analysis, (e.g., statistical analysis), and/or a comparison of the time intensity curves of the image points of the training image points. The anomaly detection algorithm may be embodied to identify the at least one comparison region based on locally and/or regionally deviating deformation, (e.g., deformation amplitude and/or direction).

Advantageously, the at least one inhomogeneously deforming training region of the anatomical object may be identified by applying the trained function to the input data. Herein, the input data of the trained function may be based on the training image data, in particular may include the training image data. Furthermore, the trained function may provide the identification of the at least one inhomogeneously deforming training region as output data.

The comparison of the at least one inhomogeneously deforming training region with the at least one inhomogeneously deforming comparison region enables the at least one parameter of the trained function to be adjusted. The comparison may include a determination of a deviation between the at least one training region and the at least one comparison region, in particular, between data points and/or image points of the image data. Herein, the at least one parameter of the trained function may advantageously be adjusted such that the deviation is minimized. The adjustment of the at least one parameter of the trained function may include optimizing, (e.g., minimizing), a cost value of a cost function, wherein the cost function characterizes, (e.g., quantifies), the deviation between the at least one training region and the at least one comparison region. In particular, the adjustment of the at least one parameter of the trained function may include regressing the cost value of the cost function. The provision of the trained function may include storage on a computer-readable storage medium and/or transmission to a provisioning unit.

Advantageously, the proposed method may provide a trained function that may be used in one embodiment of the method for providing a result dataset.

In a third aspect, the disclosure relates to a provisioning unit embodied to execute a proposed method for providing a result dataset.

The provisioning unit may advantageously include an interface, a memory unit and/or a computing unit. The provisioning unit may be embodied to execute a method for providing a result dataset in that the interface, the memory unit, and/or the computing unit are embodied to execute the corresponding method acts. The advantages of the proposed provisioning unit substantially correspond to the advantages of the proposed method for providing a result dataset. Features, advantages, or alternative embodiments mentioned in this context may also be transferred to the other claimed subject matter and vice versa.

The disclosure may furthermore relate to a training unit embodied to execute a proposed method for providing a trained function. Herein, the training unit may advantageously include a training interface, a training memory unit, and/or a training computing unit. The training unit may be embodied to execute a method for providing a trained function in that the training interface, the training memory unit, and/or the training computing unit are embodied to execute the corresponding method acts. The advantages of the proposed training unit substantially correspond to the advantages of the proposed method for providing a trained function. Features, advantages, or alternative embodiments mentioned in this context may also be transferred to the other claimed subject matter and vice versa.

In a fourth aspect, the disclosure relates to a medical imaging device including a proposed provisioning unit. Herein, the medical imaging device is embodied to capture the medical image data. The medical imaging device may be embodied as a medical X-ray device, (e.g., a medical C-arm X-ray device and/or a cone-beam computed tomography system and/or a CT system and/or an MRI system and/or a PET system and/or an ultrasound device). The advantages of the proposed imaging device substantially correspond to the advantages of the proposed method for providing a result dataset. Features, advantages, or alternative embodiments mentioned in this context may also be transferred to the other claimed subject matter and vice versa.

In a fifth aspect, the disclosure relates to a computer program product with a computer program, which may be loaded directly into a memory of a provisioning unit, with program sections for executing all acts of the method for providing a result dataset and/or one of the aspects thereof when the program sections are executed by the provisioning unit; and/or which may be loaded directly into a training memory of a training unit with program sections for executing all acts of a proposed method for providing a trained function and/or one of the aspects thereof when the program sections are executed by the training unit.

The disclosure may furthermore relate to a computer program or a computer-readable storage medium including a trained function that has been provided by a proposed method or one aspect thereof.

An extensively software-based implementation has the advantage that it is possible to retrofit provisioning units and/or training units already in use in a simple way via a software update in order to work in the manner according to the disclosure. In addition to the computer program, such a computer program product may optionally include additional parts, such as, for example, documentation and/or additional components, and hardware components, such as, for example, hardware keys (dongles, etc.) for using the software.

BRIEF DESCRIPTION OF THE DRAWINGS

Embodiments of the disclosure are depicted in the drawings and described in more detail below. In different figures, the same reference symbols are used for the same features.

DETAILED DESCRIPTION

Figure 1:
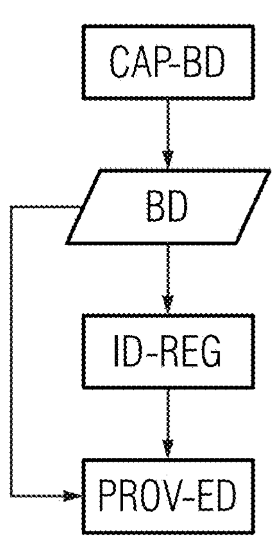
FIG. 1 and FIGS. 6 to 8 provide schematic depictions of various advantageous embodiments of a method for providing a result dataset.

FIG. 1 is a schematic depiction of an advantageous embodiment of a proposed method for providing PROV-ED a result dataset. Herein, medical image data BD may be captured CAP-BD to map a change in an anatomical object in an examination object in a spatially and temporally resolved manner. Herein, the anatomical object may have a hollow organ and/or a vessel portion and/or an aneurysm and/or an organ and/or tissue. Furthermore, at least one inhomogeneously deforming region REG of the anatomical object may be identified ID-REG based on the image data BD. In addition, the result dataset may be provided PROV-ED based on the image data BD. Herein, the result dataset may have a dedicated map and/or at least one deformation parameter of the at least one inhomogeneously deforming region REG.

The capturing CAP-BD of the medical image data BD may include acquiring a plurality of projection mappings that map the change in the anatomical object in the examination object from at least partially different projection directions. Herein, an acquisition rate for acquiring the projection mappings may be adjusted in dependence on a heart rate and/or respiratory rate of the examination object. In addition, the projection directions of in each case adjacent projection mappings may have an acute angle with respect to one another. Furthermore, the image data BD may be reconstructed from the projection mappings. Advantageously, the provision PROV-ED of the result dataset may include a reconstruction of the dedicated map of the at least one inhomogeneously deforming region REG from the projection mappings. Herein, the reconstruction may be spatially and temporally limited to the at least one inhomogeneously deforming region REG. In addition, the at least one inhomogeneously deforming region REG of the anatomical object may be identified based on time intensity curves of image points of the image data BD that maps a wall of the anatomical object.

Figure 2:
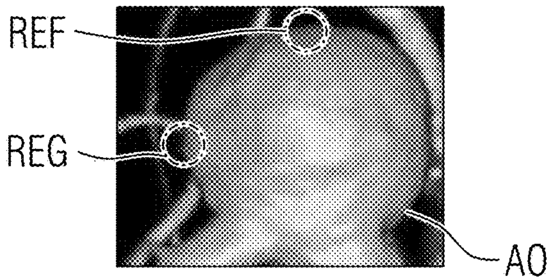
FIGS. 2 and 3 provide schematic depictions of an example of an anatomical object at different time points.
Figure 3:
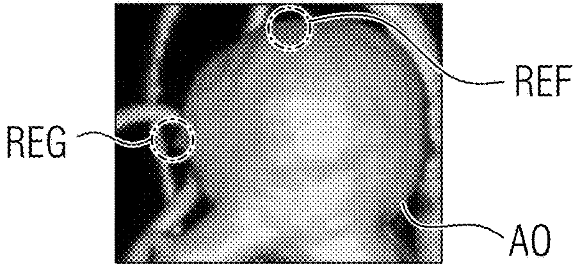

FIGS. 2 and 3 show schematic depictions of the anatomical object AO at different points in time, in particular successive points in time. FIGS. 2 and 3 in each case depict two regions of interest (ROIs) of the anatomical object AO. Herein, REF marks a homogeneously deforming region and REG the inhomogeneously deforming region of the anatomical object AO. Compared to FIG. 2, in FIG. 3, the inhomogeneously deforming region REG has a bleb, while the homogeneously deforming region REF is almost unchanged.

Figures 4, 5:
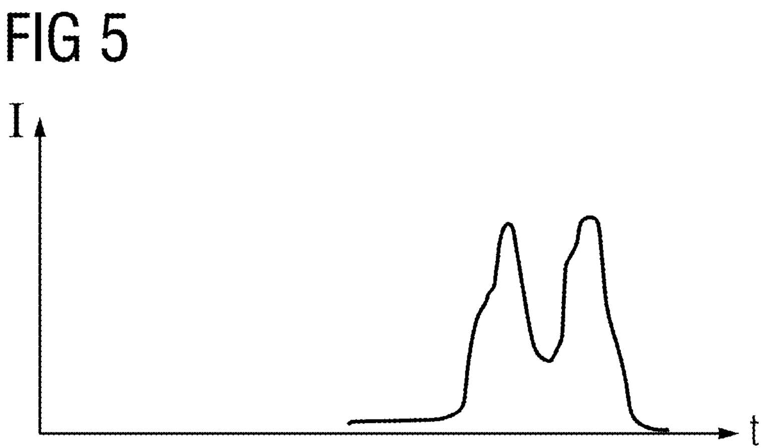
FIGS. 4 and 5 provide schematic depictions of examples of time intensity curves of homogeneously and inhomogeneously deforming regions of an anatomical object.

FIG. 4 is a schematic depiction of a time intensity curve I(t) of the homogeneously deforming region REF of the anatomical object AO. Furthermore, FIG. 5 is a schematic depiction of a time intensity curve I(t) of the inhomogeneously deforming region REG of the anatomical object AO. The time intensity curve I(t) depicted in FIG. 4 has an initial rise and a final descent with only slight and homogeneous fluctuations, in particular pulsations. In contrast, the time intensity curve I(t) depicted in FIG. 5 has a comparatively strong and inhomogeneous fluctuation, in particular pulsation.

Figure 6:
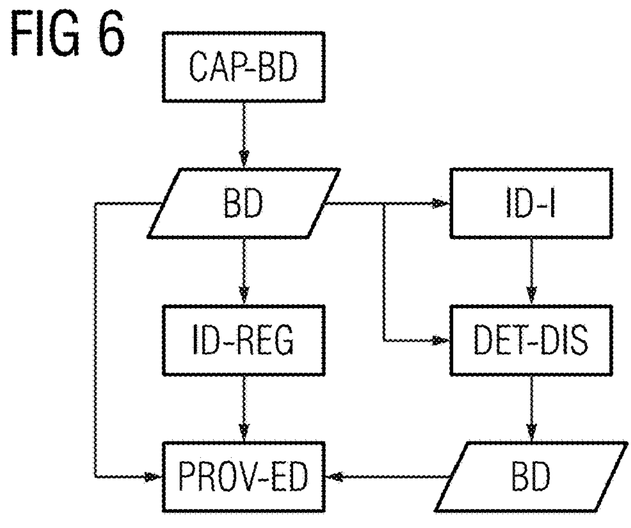

FIG. 6 is a schematic depiction of a further advantageous embodiment of a proposed method for providing PROV-ED a result dataset. Herein, a map of an initial state of the anatomical object may be identified ID-I in the image data BD. Furthermore, in each case a displacement field for further states of the anatomical object mapped in the image data BD may be determined DET-DIS with respect to the initial state. Herein, the result dataset may additionally be provided PROV-ED based on the displacement fields.

Advantageously, the at least one deformation parameter having in each case a strain tensor may be determined as a gradient of the displacement fields. In addition, the at least one deformation parameter includes one or more of: (1) a maximum strain tensor that, for image points of the image data BD mapping a wall of the anatomical object AO, relates to a temporal maximum of a strain on the wall; (2) strain rate tensors as the time derivative of the strain tensors; or (3) strain rate tensors as the time derivative of the strain tensors and a maximum strain rate tensor, which, for image points of the image data BD mapping a wall of the anatomical object AO, relates to a temporal maximum of a strain rate of the wall.

Figure 7:
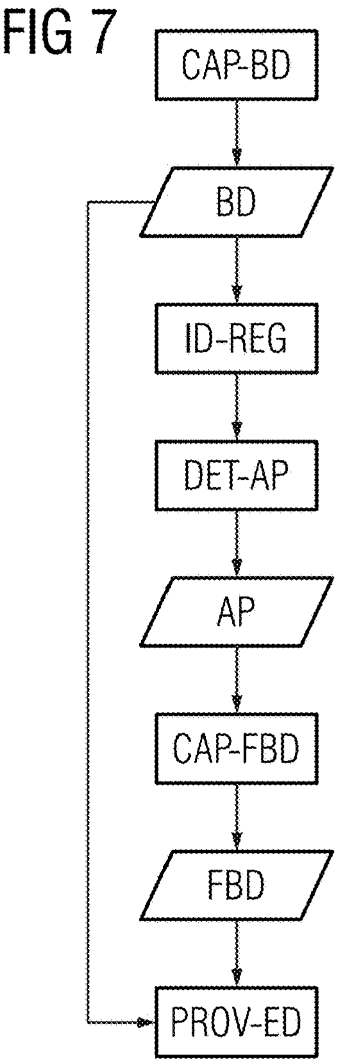

FIG. 7 is a schematic depiction of a further advantageous embodiment of the method for providing PROV-ED a result dataset. Herein, an acquisition parameter AP for a dedicated map of the at least one inhomogeneously deforming region REG may be determined. In addition, further medical image data FBD may be captured CAP-FBD by the acquisition parameter AP. Herein, the result dataset may additionally be provided PROV-ED based on the further image data FBD. Advantageously, the acquisition parameter AP may have at least one projection direction for acquiring further projection mappings of the at least one inhomogeneously deforming region REG. Herein, the further image data FBD may be reconstructed from the further projection mappings.

Figure 8:
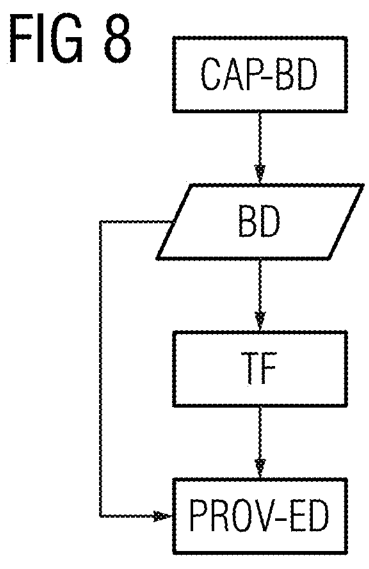

FIG. 8 is a schematic depiction of a further advantageous embodiment of a proposed method for providing PROV-ED a result dataset. Herein, the identification of the at least one inhomogeneously deforming region REG may include applying a trained function TF to input data based on the image data BD. In addition, at least one parameter of the trained function TF may be adjusted based on a comparison of at least one inhomogeneously deforming training region with at least one inhomogeneously deforming comparison region.

Figure 9:
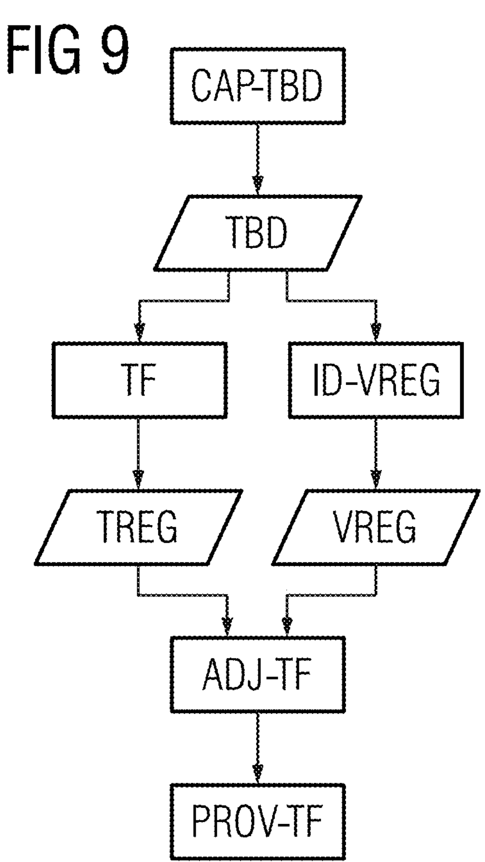
FIG. 9 provides a schematic depiction of an advantageous embodiment of a method for providing a trained function.

FIG. 9 is a schematic depiction of an advantageous embodiment of a proposed method for providing PROV-TF a trained function TF. Herein, medical training image data TBD that maps a change in an anatomical training object in a training examination object in a spatially and temporally resolved manner may be captured CAP-TBD. Furthermore, at least one inhomogeneously deforming comparison region VREG of the anatomical training object may be identified ID-VREG based on user input and/or annotation and/or based on time intensity curves of image points of the training image data TBD and/or by applying an anomaly detection algorithm. In addition, at least one inhomogeneously deforming training region TREG of the anatomical training object may be identified by applying the trained function TF to input data based on the training image data TBD. Then, at least one parameter of the trained function TF may be adjusted ADJ-TF by comparing the at least one inhomogeneously deforming training region TREG with the at least one inhomogeneously deforming comparison region VREG. Then, the trained function may be provided PROV-TF.

Figure 10:
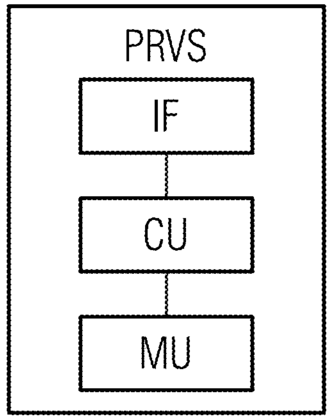
FIG. 10 provides a schematic depiction of an example of a provisioning unit.

FIG. 10 is a schematic depiction of a provisioning unit PRVS. Herein, the provisioning unit PRVS may include a computing unit CU, a memory unit MU, and/or an interface IF. The provisioning unit PRVS may be embodied to execute a proposed method for providing PROV-ED a result dataset in which the interface IF, the computing unit CU, and/or the memory unit MU are embodied to execute the corresponding method acts.

Figure 11:
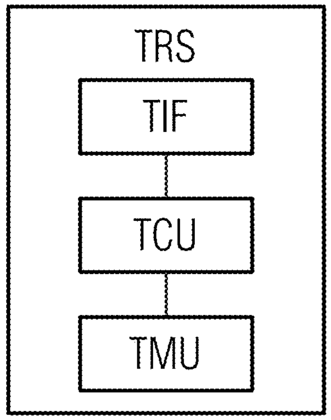
FIG. 11 provides a schematic depiction of an example of a training unit.

FIG. 11 is a schematic depiction of an example of a training unit TRS. Herein, the training unit TRS may advantageously include a training interface TIF, a training memory unit TMU, and/or a training computing unit TCU. The training unit TRS may be embodied to execute a method for providing PROV-TF a trained function TF in that the training interface TIF, the training memory unit TMU, and/or the training computing unit TCU are embodied to execute the corresponding method acts.

Figure 12:
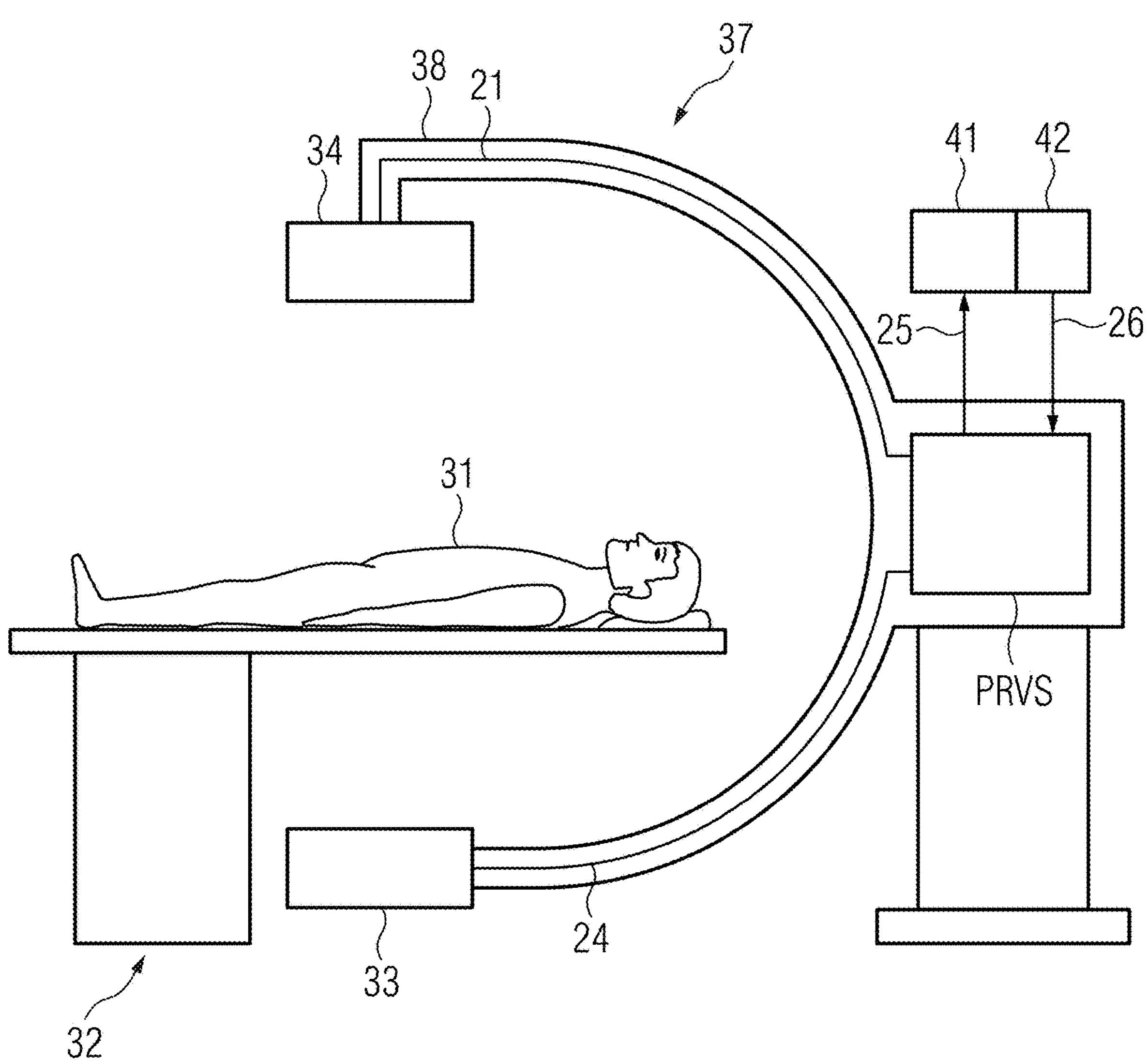
FIG. 12 provides a schematic depiction of an example of a medical imaging device.

FIG. 12 depicts a medical C-arm X-ray device 37 as an example of a medical imaging device including a proposed provisioning unit PRVS. The medical C-arm X-ray device 37 may advantageously include a detector 34, (e.g., an X-ray detector), and a source 33, (e.g., an X-ray source), which are arranged in a defined arrangement on a C-arm 38. The C-arm 38 of the C-arm X-ray device 37 may be mounted movably about one or more axes. To acquire the medical image data BD of the examination object 31 positioned on a patient support apparatus 32, the provisioning unit PRVS may send a signal 24 to the X-ray source 33. Then, the X-ray source 33 may emit an X-ray beam bundle. Upon impact of the X-ray beam bundle, after interaction with the examination object 31, on a surface of the detector 34, the detector 34 may send a signal 21 to the provisioning unit PRVS. The provisioning unit PRVS may capture CAP-BD medical image data BD based on the signal 21.

The system may furthermore have an input unit 42, (e.g., a keyboard), and a display unit 41, (e.g., a monitor and/or a display and/or a projector). The input unit 42 may be integrated into the display unit 41, for example, in the case of a capacitive and/or resistive input display. The input unit 42 may advantageously be embodied to capture user input. For this purpose, the input unit 42 may send a signal 26 to the provisioning unit PRVS. The provisioning unit PRVS may be embodied to be controlled in dependence on the user input, in particular the signal 26, in particular for executing a method for providing a result dataset PROV-ED. The display unit 41 may advantageously be embodied to display a graphical depiction of the image data BD and/or the result dataset, in particular the dedicated map and/or the deformation parameters. For this purpose, the provisioning unit PRVS may send a signal 25 to the display unit 41.

The schematic depictions in the figures described do not depict any scale or size relationships.

Finally, reference is made once again to the fact that the methods described above in detail and the apparatuses depicted are only embodiments that may be modified by the person skilled in the art in a wide variety of ways without departing from the scope of the disclosure. Furthermore, the use of the indefinite article "a" or "an" does not preclude the possibility of the features in question also being present on a multiple basis. Similarly, the terms "unit" and "element" do not preclude the possibility that the components in question include a plurality of interacting sub-components, which may also be spatially distributed.

In the context of the present application, the expression "based on" may in particular be understood in the sense of the expression "using". In particular, wording according to which a first feature based on a second feature is generated (alternatively: ascertained, determined, etc.) does not preclude the possibility that the first feature may be generated (alternatively: ascertained, determined etc.) based on a third feature.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for providing a result dataset, the method comprising:

capturing medical image data, wherein the medical image data maps a change in an anatomical object in an examination object in a spatially and temporally resolved manner;

identifying at least one inhomogeneously deforming region of the anatomical object based on the medical image data; and providing the result dataset based on the medical image data, wherein the result dataset has a dedicated map of the at least one inhomogeneously deforming region, at least one deformation parameter of the at least one inhomogeneously deforming region, or a combination thereof.

2. The method of claim 1, wherein a map of an initial state of the anatomical object is identified in the medical image data, wherein a displacement field is determined for each further state of the anatomical object mapped in the medical image data with respect to the initial state, and wherein the result dataset is additionally provided based on the displacement fields.

3. The method of claim 2, wherein the at least one deformation parameter having in each case a strain tensor is determined as a gradient of the displacement fields.

4. A method for providing a result dataset, the method comprising:

capturing medical image data, wherein the medical image data maps a change in an anatomical object in an examination object in a spatially and temporally resolved manner;

identifying at least one inhomogeneously deforming region of the anatomical object based on the medical image data;

identifying a map of an initial state of the anatomical object in the medical image data;

determining a displacement field for each further state of the anatomical object mapped in the medical image data with respect to the initial state;

providing the result dataset based on the medical image data and the displacement fields, wherein the result dataset has a dedicated map of the at least one inhomogeneously deforming region, at least one deformation parameter of the at least one inhomogeneously deforming region, or a combination thereof, wherein the at least one deformation parameter having in each case a strain tensor is determined as a gradient of the displacement fields, and wherein the at least one deformation parameter comprises one or more of:

a maximum strain tensor that, for image points of the medical image data mapping a wall of the anatomical object, relates to a temporal maximum of strain on the wall;

strain rate tensors as a time derivative of the strain tensors; or the strain rate tensors as the time derivative of the strain tensors and a maximum strain rate tensor that, for the image points of the medical image data mapping the wall of the anatomical object, relates to a temporal maximum of a strain rate of the wall.

5. The method of claim 4, wherein the capturing of the medical image data comprises acquiring a plurality of projection mappings that map the change in the anatomical object in the examination object from at least partially different projection directions, wherein an acquisition rate for acquiring the plurality of projection mappings is adjusted in dependence on a heart rate, a respiratory rate, or both the heart rate and the respiratory rate of the examination object, wherein projection directions of adjacent projection mappings of the plurality of projection mappings have an acute angle to one another, and wherein the medical image data is reconstructed from the plurality of projection mappings.

6. The method of claim 5, wherein the providing of the result dataset comprises reconstructing the dedicated map of the at least one inhomogeneously deforming region from the plurality of projection mappings, and wherein the reconstructing is spatially and temporally limited to the at least one inhomogeneously deforming region.

7. The method of claim 6, wherein an acquisition parameter for the dedicated map of the at least one inhomogeneously deforming region is determined based on the identifying of the at least one inhomogeneously deforming region, wherein further medical image data is captured by the acquisition parameter, and wherein the result dataset is additionally provided based on the further medical image data.

8. The method of claim 7, wherein the acquisition parameter has at least one projection direction for acquiring further projection mappings of the at least one inhomogeneously deforming region, and wherein the further medical image data is reconstructed from the further projection mappings.

9. The method of claim 1, wherein the capturing of the medical image data comprises acquiring a plurality of projection mappings that map the change in the anatomical object in the examination object from at least partially different projection directions, wherein an acquisition rate for acquiring the plurality of projection mappings is adjusted in dependence on a heart rate, a respiratory rate, or both the heart rate and the respiratory rate of the examination object, wherein projection directions of adjacent projection mappings of the plurality of projection mappings have an acute angle to one another, and wherein the medical image data is reconstructed from the plurality of projection mappings.

10. The method of claim 9, wherein the providing of the result dataset comprises reconstructing the dedicated map of the at least one inhomogeneously deforming region from the plurality of projection mappings, and wherein the reconstructing is spatially and temporally limited to the at least one inhomogeneously deforming region.

11. The method of claim 1, wherein an acquisition parameter for the dedicated map of the at least one inhomogeneously deforming region is determined based on the identifying of the at least one inhomogeneously deforming region, wherein further medical image data is captured by the acquisition parameter, and wherein the result dataset is additionally provided based on the further medical image data.

12. The method of claim 11, wherein the acquisition parameter has at least one projection direction for acquiring further projection mappings of the at least one inhomogeneously deforming region, and wherein the further medical image data is reconstructed from the further projection mappings.

13. The method of claim 1, wherein the anatomical object comprises a hollow organ, a vessel portion, an aneurysm, an organ, a tissue, or a combination thereof.

14. The method of claim 13, wherein the at least one inhomogeneously deforming region of the anatomical object is identified based on time intensity curves of image points of the medical image data that maps a wall of the anatomical object.

15. The method of claim 1, wherein the identifying of the at least one inhomogeneously deforming region of the anatomical object comprises applying a trained function to input data, wherein the input data is based on the medical image data, and wherein at least one parameter of the trained function is adjusted based on a comparison of at least one inhomogeneously deforming training region with at least one inhomogeneously deforming comparison region.

16. A medical imaging device comprising:

a provisioning unit configured to:

capture medical image data, wherein the medical image data maps a change in an anatomical object in an examination object in a spatially and temporally resolved manner;

identify at least one inhomogeneously deforming region of the anatomical object based on the medical image data; and provide a result dataset based on the medical image data, wherein the result dataset has a dedicated map of the at least one inhomogeneously deforming region, at least one deformation parameter of the at least one inhomogeneously deforming region, or a combination thereof.

17. The medical imaging device of claim 16, wherein the at least one inhomogeneously deforming region of the anatomical object comprises a local bleb in a wall of the anatomical object.

18. The medical imaging device of claim 16, wherein the at least one inhomogeneously deforming region of the anatomical object comprises a deformation that deviates from adjacent tissue of the anatomical object.

19. The method of claim 1, wherein the at least one inhomogeneously deforming region of the anatomical object comprises a local bleb in a wall of the anatomical object.

20. The method of claim 1, wherein the at least one inhomogeneously deforming region of the anatomical object comprises a deformation that deviates from adjacent tissue of the anatomical object.

* * * * *